(12) United States Patent
Tsai

(10) Patent No.: US 6,877,588 B1
(45) Date of Patent: Apr. 12, 2005

(54) BIKE CANTILEVER BRAKE ARM

(75) Inventor: Szu-Fang Tsai, Chang-Hua Hsien (TW)

(73) Assignee: Tektro Technology Corporation, Chang-Hua Hsien (TW)

( * ) Notice: Subject to any disclaimer, the term of this patent is extended or adjusted under 35 U.S.C. 154(b) by 0 days.

(21) Appl. No.: 10/834,884

(22) Filed: Apr. 30, 2004

(51) Int. Cl.$^7$ .................................................. B62L 3/00
(52) U.S. Cl. .................................. 188/24.22; 188/24.13
(58) Field of Search .......................... 188/24.11, 24.12, 188/24.13, 24.15, 24.19, 24.21, 24.22

(56) References Cited

U.S. PATENT DOCUMENTS

| | | | | |
|---|---|---|---|---|
| 4,838,387 A | * | 6/1989 | Yoshigai | 188/24.21 |
| 5,058,450 A | * | 10/1991 | Yoshigai | 74/502.2 |
| 5,117,948 A | * | 6/1992 | Yoshigai | 188/24.19 |
| 5,743,284 A | * | 4/1998 | Lumpkin | 188/24.22 |
| 5,788,020 A | * | 8/1998 | Tseng | 188/24.12 |
| 5,853,069 A | * | 12/1998 | Lee et al. | 188/24.19 |
| 5,996,743 A | * | 12/1999 | Tseng | 188/24.19 |
| 6,039,153 A | * | 3/2000 | Sugimoto | 188/24.22 |
| 6,155,383 A | * | 12/2000 | Sugimoto | 188/24.12 |
| 6,173,818 B1 | * | 1/2001 | Kuo | 188/24.19 |
| 6,257,375 B1 | * | 7/2001 | Tseng | 188/24.19 |

FOREIGN PATENT DOCUMENTS

| | | | |
|---|---|---|---|
| EP | 0596237 | * | 5/1994 |
| EP | 0849152 | * | 6/1998 |

* cited by examiner

*Primary Examiner*—Robert A. Siconolfi
*Assistant Examiner*—Devon Kramer
(74) *Attorney, Agent, or Firm*—Leong C. Lei

(57) ABSTRACT

A bike cantilever brake arm having a sleeve fixed to the brake arm through an axle bore provided at the bottom of the brake arm; a scroll section of the rod spring being inserted to a ring provided on one side of the sleeve and covered with a cap; a locking ring is provided on one side of the sleeve to receive insertion of a rubber ring from the opposite side of the adjustment base; a slot and a hooking section being provided on one end of the rubber ring to merely engage the locking ring of the sleeve; another end of the rubber ring extending a retaining edge to retain the adjustment base; and the brake arm, the cap, the rod spring and the adjustment base all being ex-factory made in one piece to keep them integral during transition and the subsequent assembly.

2 Claims, 5 Drawing Sheets

BIKE CANTILEVER BRAKE ARM

BACKGROUND OF THE INVENTION (a) Technical Field of the Invention

The present invention is related to an improved structure of a brake arm in a cantilever brake of a bike, and more particularly to one that is provided with simplified components, fast installation, production cost saving and significant economic benefits.

(b) Description of the Prior Art

Referring to FIG. 1 of the accompanying drawings, a cantilever brake arm 1 of the prior art has inserted to its axle bore 11 a bushing 121 provided with an adjustment base 12. Wherein, the other side of the adjustment base 12 is disposed with a pin 122 to be inserted into a hole 132 provided on one side of a shaft 133 extending from a seat stay 13 of the bike and secured to hold the adjustment base 12 in position. A ring 123 in its diameter greater than that of the bushing 121 is provided at the bottom of the bushing 121 of the adjustment base 12 to merely receive the insertion of a scroll section 141 of a rod spring 14 to be then covered with a cap 15 at the scroll section 141 of the rod spring 14. An adjustment screw 125 is inserted through a folded end 124 of adjustment base 12 to regulate the force of the rod spring 14 by having the adjustment screw 124 to compress against a control section 142 of the rod spring 14. Meanwhile, an inner axle bore 126 in the bushing 121 of the adjustment base 12 is inserted onto the shaft 131 from the seat stay 13 with an end screw 16 inserted into the inner axle bore 133 of the shaft 131 to properly hold against the brake arm 1. However, those many components including the adjustment base 12, the rod spring 14, the cap 15, the brake arm 1 and the end screw 16 in the structure of the brake arm 1 of the prior art are not tightly constructed, and the assembly of the brake arm 1 is a complicated process involving insertion, alignment, penetration and screw even for a professional worker who is familiar with the assembly process, let alone those in ordinary bike repair shops.

SUMMARY OF THE INVENTION

The primary purpose of the present invention is to provide an improved structure of a bike cantilever brake arm to facilitate keeping integral of the parts in transition, but also the subsequently assembly work. To achieve the purpose, a sleeve is fixed to the brake arm through an axle bore provided at the bottom of the brake arm. A scroll section of the rod spring is inserted to a ring provided on one side of the sleeve and covered with a cap and a locking ring is provided on one side of the sleeve to receive insertion of a rubber ring from the opposite side of the adjustment base. A slot and a hooking section are provided on one end of the rubber ring to merely engage the locking ring of the sleeve; a retaining edge extends from another end of the rubber ring to retain the adjustment base, and all of the brake arm, the cap, the rod spring and the adjustment base are ex-factory made in one-piece.

Another purpose of the present invention is to provide an improved structure of a bike cantilever brake arm to save the cost of the bushing, reduce production costs and meet the requirements for better economic benefits. To achieve the purpose, only the ring is provided to the adjustment base without any bushings as required in the prior art.

Yet another purpose of the present invention is to provide an improved structure of a bike cantilever brake arm. Wherein, slot is provided on the top of the rubber ring to render better expansion at the end edge of the rubber ring, thus to facilitate the hooking section to merely hook up a clip retaining a sleeve.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
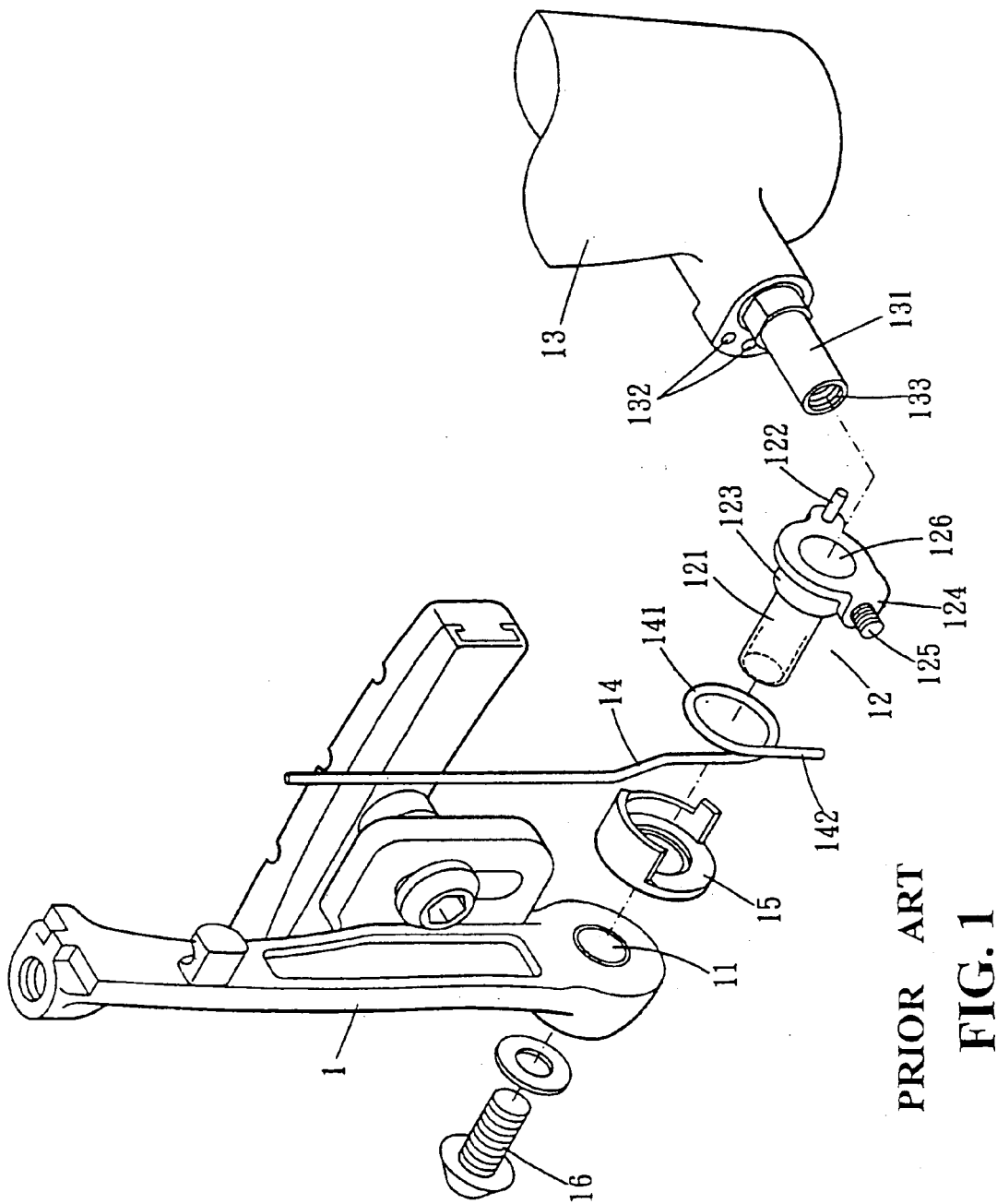
FIG. 1 is an exploded view of a brake arm of the prior art
Figure 2:
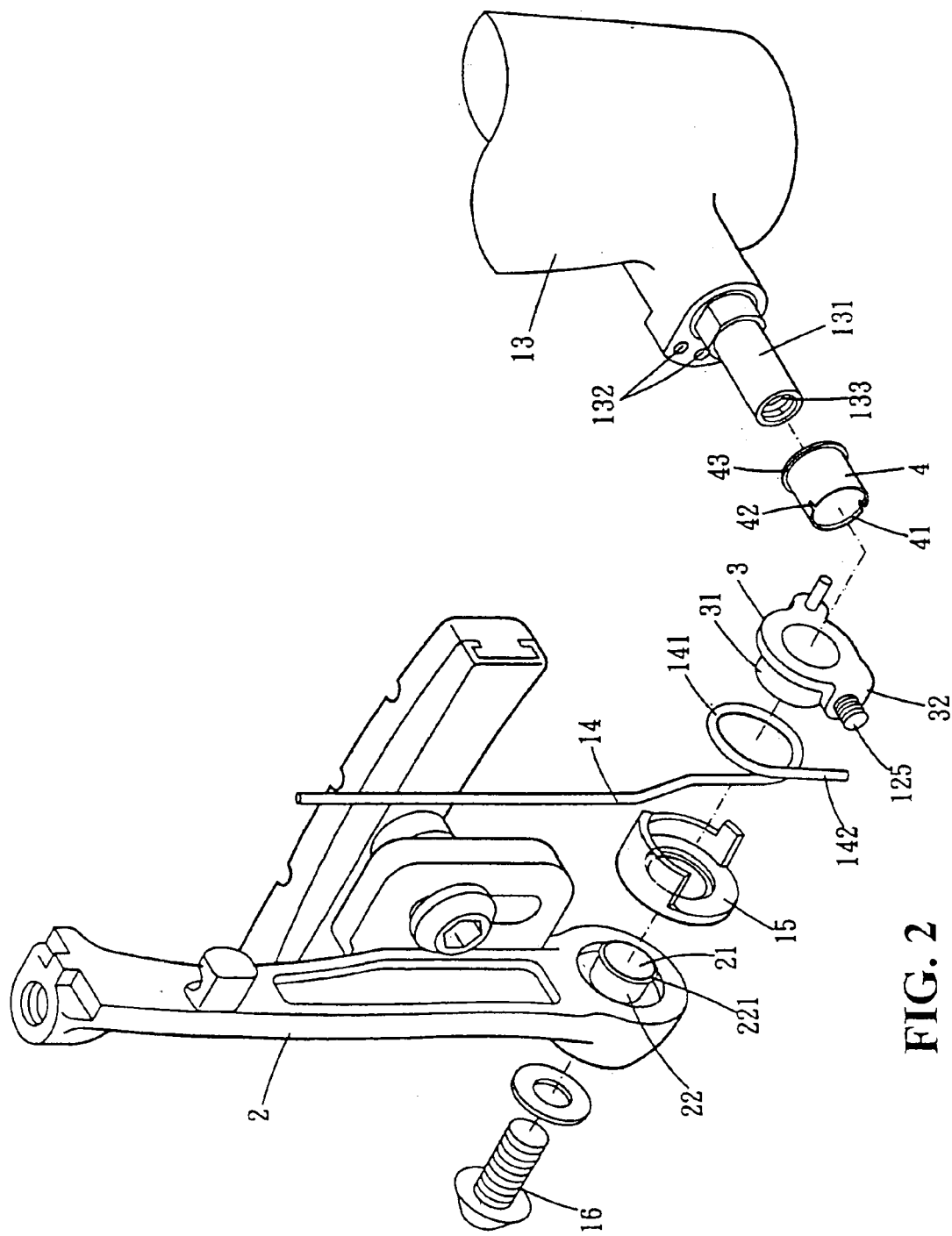
FIG. 2 is an exploded view of a preferred embodiment of the present invention.
Figure 3:
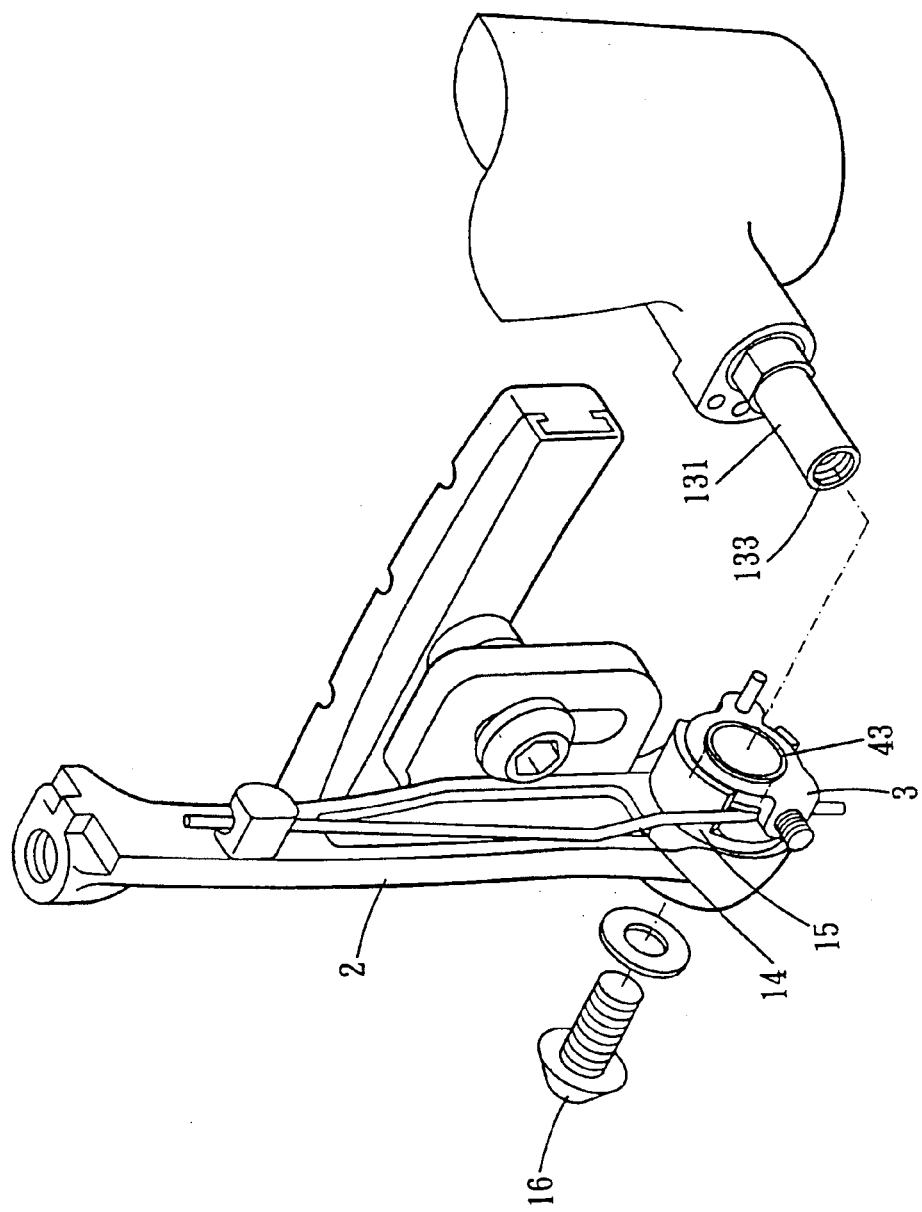
FIG. 3 is a schematic view showing an assembly of the preferred embodiment of the present invention.
Figures 4, 4A:
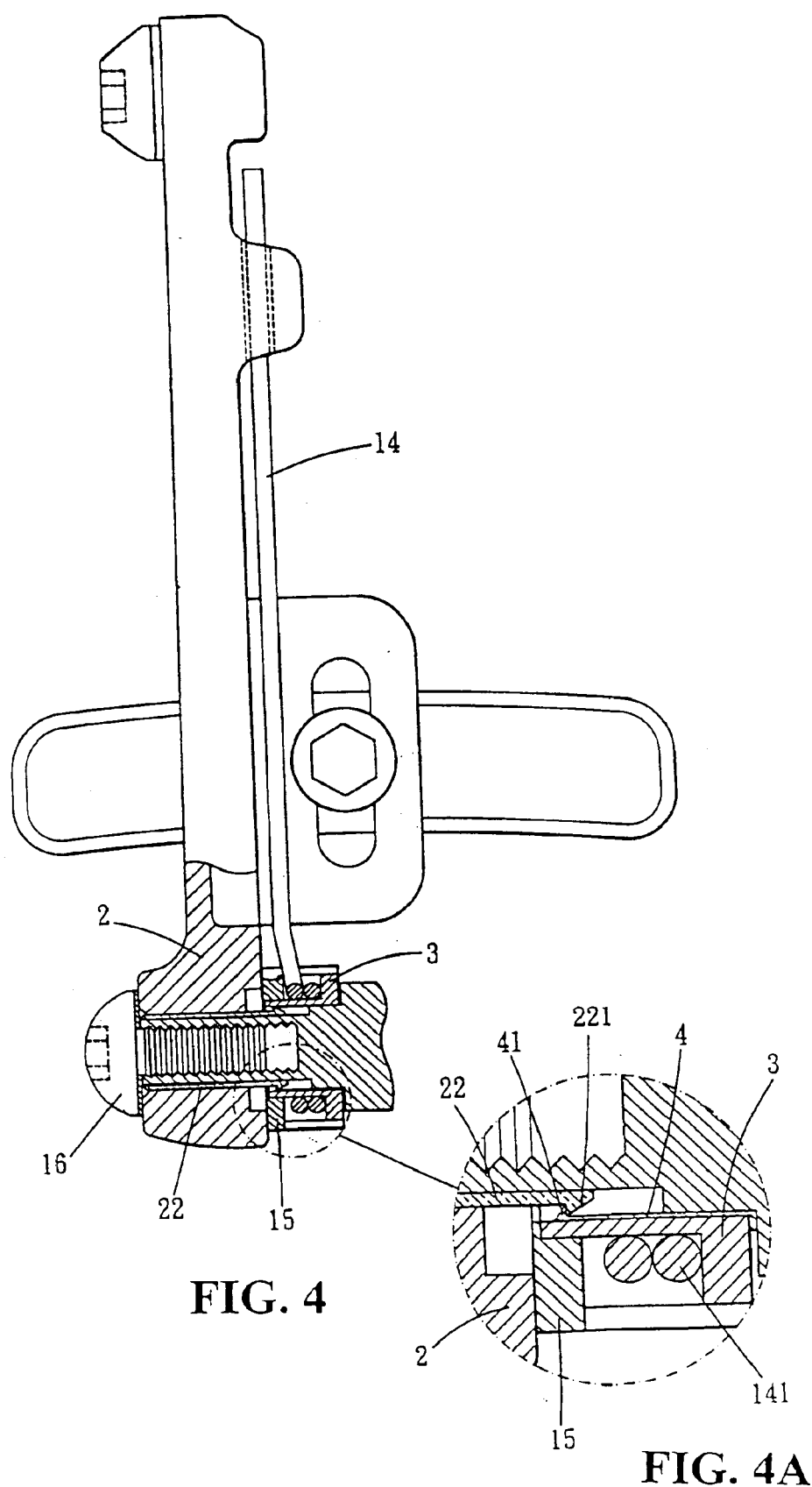
FIGS. 4 and 4A are sectional views of the assembly of the preferred embodiment of the present invention.
Figure 5:
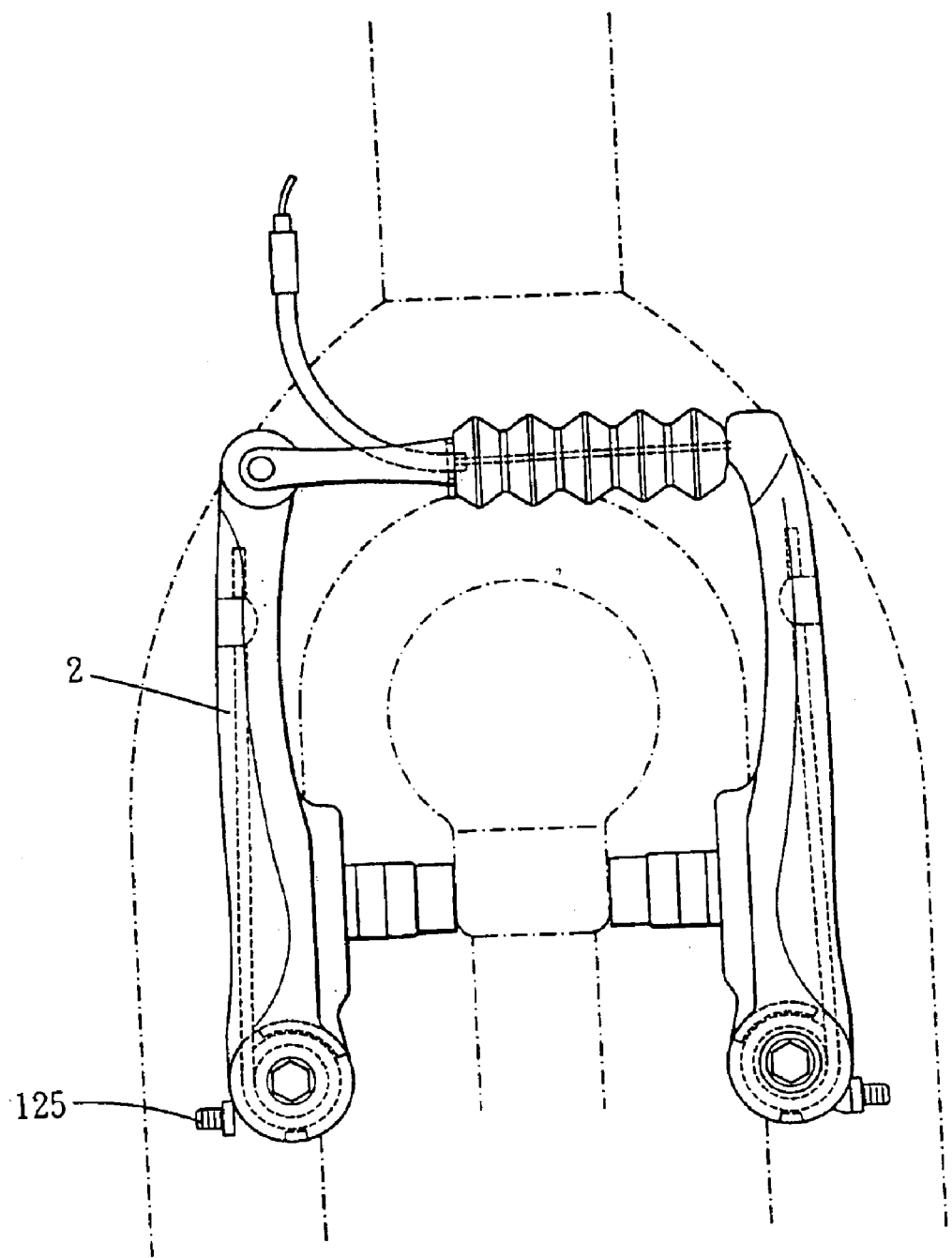
FIG. 5 is a schematic view of the preferred embodiment of the present invention in use.

Referring to FIGS. 2 through 5, a preferred embodiment of the present invention of a bike cantilever brake arm is essentially comprised of a brake arm 2, an adjustment base 3, a rod spring 14, a cap 15, a rubber ring 4, and an end screw 16. A sleeve 22 is fixed to the brake arm 2 through an axle bore 21 provided at the bottom of the brake arm 2. A locking ring 221 is provided on one side of the sleeve 22. A scroll section 141 of the rod spring 14 is inserted to a ring section 31 on one side of the adjustment base 3 and is covered up with the cap 15. The rubber ring 4 is then inserted from the opposite side of the adjustment base 3 so that the rubber ring 4 merely engages the locking ring 221 of the sleeve 22 by a slot 42 and a hooking section provided on one end of the rubber ring. Meanwhile, a retaining edge 43 extends from the other end of the rubber ring 4 to retain the adjustment base 3. Accordingly, the brake arm 2, the cap 15, the rod spring 14, and the adjustment base 3 are made in one-piece ex-factory as illustrated in FIG. 3 to facilitate the subsequent assembly.

Furthermore, a folded end 32 is provided to the adjustment base for the insertion by an adjustment screw 125. The adjustment screw 125 pushes against the rod spring 14 to compress a control section 142 of the rod spring 14 for achieving the purpose of regulating the force of the rod spring 14. The end screw 16 holds against an inner axle bore 133 provided in a shaft 131 protruding from the adjustment base 13 so to limit the brake arm 2 without affecting the tuning of the brake arm 2 when a brake is exercised.

It is to be noted that the slot 42 and the hooking section 41 provided at one end of the rubber ring 4 merely engage the locking ring 221 of the sleeve 22 by force from the rod spring 15. While executing a brake, the brake arm 2 turns to operate by having the sleeve 22 fixed in the axle bore 21 at the bottom of the brake arm 2 to the outer circumference of the shaft 131 provided at the seat stay 13 without affecting the function of the rubber ring 4 in locking into the sleeve 22.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skied in the art without departing in any way from the spirit of the present invention.

I claim:

1. A bike cantilever brake arm essentially comprising a brake arm, an adjustment base, a rod spring, a cap and an end screw; wherein, a sleeve being fixed to the brake arm through an axle bore provided at a bottom of the brake arm; a scroll section of the rod spring being inserted to a ring provided on one side of the sleeve and covered with a cap; a locking ring being provided on one side of the sleeve to receive insertion of a rubber ring from the opposite side of the adjustment base; a slot and a hooking section being provided on one end of the rubber ring to merely engage the locking ring of the sleeve; a retaining edge being extended from another end of the rubber ring to retain the adjustment base; and all of the brake arm, the cap, the rod spring and the adjustment base being made in one-piece to keep them integral during transition and the subsequent assembly.

2. A bike cantilever brake arm as claimed in claim 1, wherein, the rubber ring is screwed to the brake arm sleeve.

\* \* \* \* \*